United States Patent [19]
Sanden

[11] 3,961,570
[45] June 8, 1976

[54] APPARATUS FOR OBTAINING A SPECIFIC FAT CONTENT IN MILK

[75] Inventor: Ulrich-Christian Sanden, Hildesheim, Germany

[73] Assignee: Diessel GmbH & Co.

[22] Filed: May 31, 1974

[21] Appl. No.: 475,095

[30] Foreign Application Priority Data
July 5, 1973  Germany............................ 2334239

[52] U.S. Cl................................... 99/452; 99/485
[51] Int. Cl.² ............................................ A23C 9/00
[58] Field of Search.......... 426/231, 519; 73/422 R, 73/422.4, 425 R, 425.4 P; 23/231; 233/19 R; 259/4, 18, 154, 149; 99/452, 485, 484, 483, 275; 235/92 B; 137/88, 92, 93

[56] References Cited
UNITED STATES PATENTS

| | | | |
|---|---|---|---|
| 2,971,453 | 2/1961 | Kintner | 99/452 |
| 3,433,648 | 3/1969 | Collins | 99/452 |
| 3,506,460 | 4/1970 | Bayne | 99/275 |
| 3,807,701 | 4/1974 | Reid | 259/4 R |

*Primary Examiner*—Robert W. Jenkins
*Attorney, Agent, or Firm*—Gilbert L. Wells

[57] ABSTRACT

An improvement in the method and apparatus for obtaining the specific fat content of milk wherein whole milk and skimmed milk are mixed together as they flow, and the amount of skimmed milk is added according to the previously determined fat content of the whole milk, the fluid quantities of the whole milk and skimmed milk being continuously measured. The method and apparatus are improved by continuously taking samples of the whole milk and continuously determining their fat content, and in between taking the samples and the admixture of the skimmed milk while the whole milk is retained in its supply line for the period of time between the taking and/or evaluation of the particular sample and the controlling of the skimmed milk admixture.

19 Claims, 4 Drawing Figures

APPARATUS FOR OBTAINING A SPECIFIC FAT CONTENT IN MILK

CROSS REFERENCES TO RELATED APPLICATIONS

Applicant claims priority under 35 U.S.C. 119 for Application P 23 34 239.4, filed July 5, 1973, in the Patent Office of the Federal Republic of Germany.

The disclosures of Applications Serial Nos. 395,349 and 451,961, filed Sept. 7, 1973 and Mar. 18, 1974, respectively, in the U.S. Pat. Office, and having the same assignee as the present invention are incorporated herein. Application Ser. No. 451,961 discloses the state of the art of systems for measuring the flow and recording the quantities of liquids. Application Ser. No. 395,349 discloses a rotary piston meter for measuring the flow of liquids.

BACKGROUND OF THE INVENTION

The present invention relates to an apparatus for bringing milk to a specific fat content in which whole milk and skimmed milk are mixed as they flow, and the skimmed milk is added according to the previously determined fat content of the whole milk, the flow quantities of whole milk and skimmed milk being measured continuously.

Processes of this type are required to determine the fat content of the milk as accurately as possible and thereby obtain so-called "standardized milk". In this process, whole milk and skimmed milk are combined, that is, the whole milk is diluted by the skimmed milk. In Germany, the minimum fat content of milk is a legal requirement. This minimum content is set at 3.5 percent and must be maintained. The same applies in England according to the new EEC regulations.

In the case of a known process of the type mentioned initially, the sample for determining the fat content of the whole milk is taken by hand from a large intermediate container of whole milk. The fat content of the whole milk is then determined and the amount of skimmed milk to be added, which is gauged therefrom, is manually adjusted. This adjustment process is then constantly repeated. This process is generally effected by supplying to a regulator which is also acted on by the whole milk and skim milk volume flow values and is connected in series with an adjusting valve, a nominal value for controlling the adjusting valve corresponding to the fat content of the sample.

A disadvantage of this known process is that milk cannot flow through the particular machinery either during the time of taking the sample or during the time of determining the fat content of the sample since until the fat content of the particular sample is determined, the amount of skimmed milk to be added is not known. However, if the mixture is produced by adding an amount of skimmed milk which corresponds to the previously taken sample, incorrect mixtures can be produced. This error is serious or even inadmissible if the fat content falls below that which is legally required. In addition, a relatively long period of time elapses between the time the sample is taken and the time when the amount of skimmed milk to be added is adjusted.

SUMMARY OF THE INVENTION

Having in mind the limitations of the prior art, it is an object of the present invention to provide an apparatus of the type mentioned initially in which it is ensured that the mixing ratio obtained, that is, the standardized milk which is produced, is accurately regulated according to the fat content of the particular sample taken.

This task is solved according to the invention in that samples of the whole milk are taken continuously and their fat contents are determined and in that between the time of taking the sample and the time of mixing the whole milk with the skimmed milk, the whole milk remains in its supply line for the period between the taking and evaluation of the particular sample and the controlling of the addition of skimmed milk. This method is intended to ensure that those portions of milk from which the particular sample was previously taken have an accurate amount of skimmed milk added thereto. Hence, the added quantity of skimmed milk always corresponds precisely to the quantities of whole milk flowing through. The taking of the sample and the addition of the skimmed milk do occur at different places in the particular apparatus and also at different times, but the parts of whole milk to receive the added skimmed milk tend to move to the addition point where the evaluation signal of the sample is also received. Thus, with the method according to the present invention, a standardized milk is obtained, the fat content of which has been extremely accurately regulated and may only be subject to a very slight, practically indeterminable fluctuation in the time between consecutive fat content evaluations.

Using the basic principles of the known method in which the addition of skimmed milk is effected via an adjusting valve arranged in the skimmed milk supply flow line and acted on by a regulator, the method according to the present invention proceeds continuously when the measured fat content values, together with the whole milk and skimmed milk flow values are supplied to a computer connected in series with the regulator, this computer being acted on by a nominal value of the standardized milk fat content to be engaged and by an actual value of the fat content of the skimmed milk. The regulator is then acted on by means of this computer which considers the values supplied to it as limiting quantities and this regulator then activates the adjusting valve. The fat content of the skimmed milk normally does not have to be determined as the centrifuges for separating off the fat operate so accurately that the fat content of the skimmed milk is largely constant. Furthermore, the fat content of skimmed milk is relatively low.

The apparatus for effecting the method according to the invention departs from the known apparatus comprising a supply line for the whole milk and a supply line for the skimmed milk. These supply lines upon into a common mixing line and an adjusting valve acted on by a regulator is arranged in the supply line for the skimmed milk. To solve the problem according to the invention, and to provide a completely automatic device which supplies accurate fat content values for standarized milk, an automatic sampling device provided with a fat content evaluator is arranged in front of the volumeter in the whole milk supply line. The fat content evaluator is connected to the computer associated with the regulator and acted on by the values of the volumeter. The volume of the whole milk supply line is such that the time taken for the milk to pass through it corresponds to the sample evaluation time for the sampling time until the controlling of the adjusting valve. Owing to the volume of the whole milk supply line, the parts of whole milk reach the mixing line only if the fat content evaluation signal of the previously taken sample corresponding to these parts is present at the adjusting valve arranged in proximity to the mixing section.

If it is desired to adapt the flow time in the whole milk supply line or the period of dwell of the whole milk in the supply line to various evaluation times thereby permitting the use of different evaluation devices or installations, it is advantageous if the volume of the supply line is regulatable. For example, this may be effected by way of supply lines of varying cross section or by the connection or disconnection of additional pipe sections having the same cross section as the supply line or having different cross sections. However, it is especially advantageous if a storage container which increases the volume of the supply line is arranged in the whole milk supply line. This makes it possible to adjust the period of dwell of the whole milk in the supply line to depend on the volume of the whole milk present in the storage container or flowing therethrough and thus to adapt the period of dwell to the particular requirements.

It is also advantageous if the volume of the storage container can be regulated. This is effected when the side walls or base of the storage container are displaceable. When a volume measuring device is provided the storage container can also be the vapor eliminator of this volume measuring device. In this event, a separate storage container is not required.

The apparatus according to the invention can also be operated without the fat content evaluating device should this be desirable, for example, for reasons of cost. In this case, instead of the continuous fat content evaluation, a fixed fat content value can be supplied to the device and the mixing ratio can then be deduced from this. When a computer is used, the fixed fat content value can be supplied to this. This operation may be effected by means of a manual switch on the computer which is described subsequently.

Another method of regulating the volume of the storage container consists in providing the storage container with a ventilating valve adapted to be closed by the timer, the timer being adapted to be triggered by a float in the storage container. The float in the storage container thus triggers the timer via a contact which it activates and the timer closes the ventilating valve of the storage container after a specific period of time. During this time the level in the storage container continues to rise and thus the volume of the storage container and hence the volume of the whole milk supply line can be pre-selected on the timer.

The sampling device may be a known device operating with a pipette which samples approximately 1 gram of whole milk per second, and the fat content evaluator may be a known photometric device. With an arrangement of this nature, the evaluation time and the flow time of the whole milk through the supply line amounts to about 20 seconds and thus approximately 20 grams of whole milk may be sampled by means of the sampling device during this time. An average value can then be formed from these samples when the fat content is evaluated.

To set the adjusting valve to a specific flow quantity of the skimmed milk and thus to a specific fat content value of the standardized milk, the computer is acted on by a nominal value for the fat content to be engaged for the standardized milk and by an actual value of the skimmed milk fat content. In the computer, the fat content value coming from the fat content evaluator is advantageously supplied across a multiplier to a subtracting operational amplifier in addition to a value corresponding to the product of the fat content value of the standardized milk and the flow quantity of the whole milk, the output of the subtracting operational amplifier being connected to the regulator. In this way, the difference is obtained in the subtracting operational amplifier between the product of the flow quantity of whole milk and the fat content value of the standardized milk on the one hand and the fat content value of the whole milk measured in the fat content evaluator on the other hand, and the deviations from the nominal value of the fat content of the standardized milk obtained in this way can be used by the regulator to act on the adjusting valve. As in the case of the known devices, this adjusting valve can also be automatically activated by means of a pneumatic signal.

The computer also comprises a second subtrating operational amplifier which is connected by its output to the regulator. The products of the flow quantity of whole milk, together with the fat content value of the standardized milk on the one hand, and the fat content value of the skimmed milk on the other hand, are supplied to this second operational amplifier. In this way, the actual mixture ratio resulting from the flow quantity of skimmed milk is taken into account in the control of the adjusting valve.

It is advantageous if the particular products are formed by voltage dividers preferably in the form of regulating resistances to which the flow measurements are supplied as a voltage, the fixed pre-selected resistance values corresponding to the actual values to be set for the standardized milk and skimmed milk. Tappings taken at the voltage dividers then represent the products of these quantities which are supplied in the manner described to the subtracting operational amplifiers.

It is advantageous if two identical voltage dividers are provided for the fat content value of the standardized milk. These dividers are mechanically coupled to each other and one is provided for the voltage values of the flow quantities of whole milk and the other for the voltage values of the flow quantities of skimmed milk. A further voltage divider can also be provided, the tapped value of which can be connected by means of a manual switch to the first subtracting operational amplifier in place of the value coming from the fat content evaluator and it acts as an indication of the fixed value for the fat content of the whole milk. Hence, it is possible by means of this manual switch to prevent the regulator from being acted on by a value corresponding to the particular sample taken by replacing this value by a pre-selected fixed value which can be used for specific adjustment operations or for example when the sampling device or the fat content evaluator cease to be operative for a short period of time and the device has to continue operation. In this case, the voltage divider is engaged at the value which corresponds to the fat content value above the safety level or to the minimum supply of skimmed milk.

To prevent a mixing ratio which falls below the legally required fat content value from being produced when starting the device owing to milk remaining in the supply line or in the storage container, a device is advantageously provided which closes the adjusting valve for the skimmed milk for a sufficient length of time until new whole milk has filled the supply line and possibly the storage container. For this purpose a storage member is provided in the starting line which acts on the adjusting valve for the skimmed milk for a sufficiently long time in a closing direction until a timer arranged parallel thereto releases the storage value so that the adjusting valve is acted on in the opening direction, that is, it is now subject to the signals coming from the regulator.

In place of a complete closing, during the blocking time, a fixed fat content value is supplied to the computer instead of the value coming from the fat content evaulator, the fixed value corresponding to the minimum skimmed milk supply flow. For example, the value may be supplied to the computer in the described manner via the manual switch.

BRIEF DESCRIPTION OF THE DRAWINGS

Various embodiments of the invention are now described with reference to the accompanying drawings, wherein.

DESCRIPTION OF THE PREFERRED EMBODIMENTS

Figure 1:
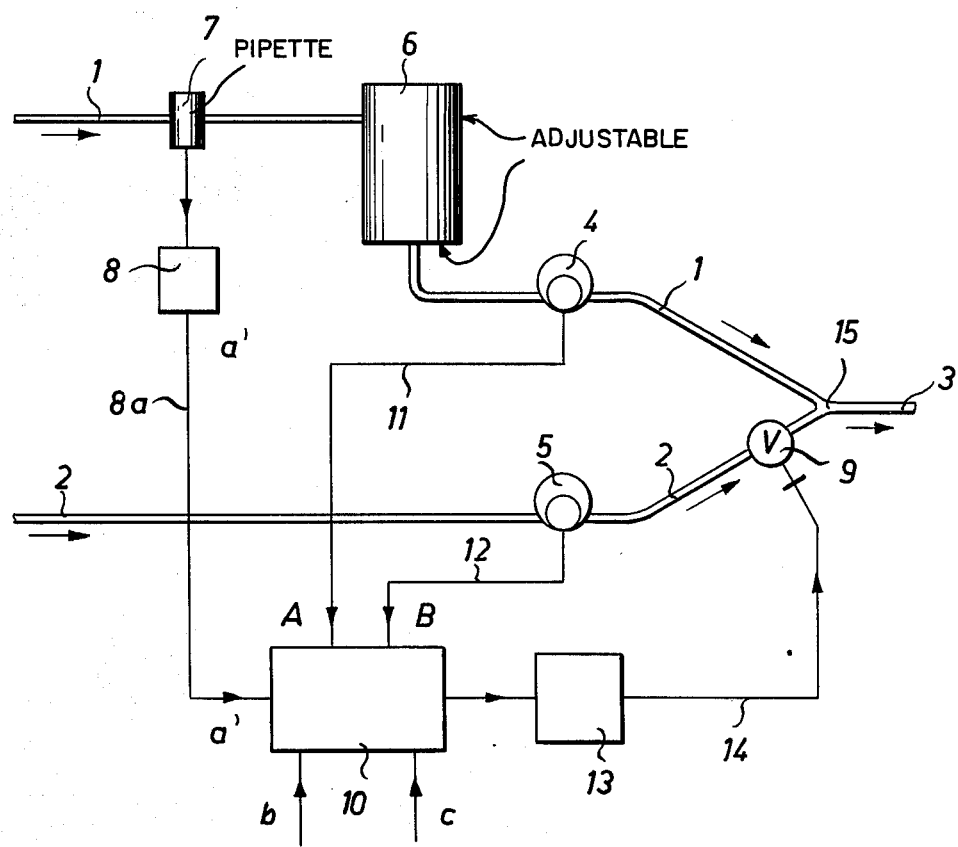
FIG. 1 is a circuit diagram of an embodiment of an apparatus for effecting the method according to the present invention.

According to FIG. 1, an apparatus for effecting the method according to the invention is provided with a supply line 1 for the whole milk and a supply line 2 for the skimmed milk. Both lines open into a mixing line 3 from which the standardized milk having a regulated fat content is obtained. The supply line 1 is provided with a volumeter 4 for measuring the flow quantities of whole milk and the supply line 2 has a volumeter 5 for measuring the flow quantities of skimmed milk.

A storage container 6 increasing the volume of the supply line 1 and a sampling device 7 having a fat content evaluator 9 are provided in the supply line 1. An adjusting valve 9 which may be penumatically activated is arranged behind the volumeter 5 in the supply line 2.

The sampling device 7 is provided with a pipette arrangement with which it can take approximately 1 gram per second of the whole milk and supply this amount to the fat evaluator 8, such as Milko-Tester MK III disclosed in Form No. 5-139 of Kosmos-Import GmbH, Hamburg, W. Germany. In the fat evaluator 8, the fat content is evaluated over a period of approximately 20 seconds, that is, during this time an average value is obtained from the individual samples. An electrical value $a'$ is obtained from the fat content evaluator 8, this value $a'$ being supplied to a computer 10 via a line 8a. The computer 10 is also acted on via electric circuit lines 11 and 12 by voltage values A and B supplied by the volumeters 4 and 5, the values A and B corresponding to the particular flow quantities. The computer 10 is also acted on by an actual value $b$ of the fat content of the skimmed milk which is engaged in a fixed manner. The computer 10 is also acted on by a value $c$ corresponding to the required fat content of the standardized milk in the mixing line 3. This value $c$ is also engaged in a fixed manner. The values of the computer 10 are supplied to a regulator 13, such as PCS-Controller I. This regulator 13 acts in a known manner via a penumatic line 14 on the adjusting valve 9.

The method of operation of the apparatus described is the following:

The volume of the supply line 1 and the storage container 6 is selected so that the time required for the whole milk to flow from the spot where the sample is taken to the spot 15 at the mouth of the mixing line 3 corresponds to the evaluation time of the sample up to the time when the adjusting valve 9 is activated. It is therefore advisable to arrange the adjusting valve 9 as close as possible to the point 15. In this way an accurate amount of the skimmed milk is always added to the parts of whole milk, the evaluation signal of which acts on the adjusting valve 9 at this time. Hence in the case of the method according to the invention, the measuring and control delays which tended to occur with the known methods are completely eliminated.

The fixed values for the fat content of the skimmed milk and the standardized milk and the flow quantities of whole milk and skimmed milk are taken into consideration in the computer 10 in the manner described in the following manner with reference to FIG. 2. For the following values:

A = flow quantity of whole milk
B = flow quantity of skimmed milk
$a$ = fat content of the whole milk
$b$ = fat content of the skimmed milk
$c$ = fat content of the standardized milk The mixing ratio of whole milk to skimmed milk is obtained as follows:

$$\frac{A}{B} = \frac{c-b}{a-c}$$

and thus: A (a-c) = B (c-b) and these product differences can be used for acting on the regulator and hence for regulating the predetermined fat content value of the standardized milk.

Figure 2:
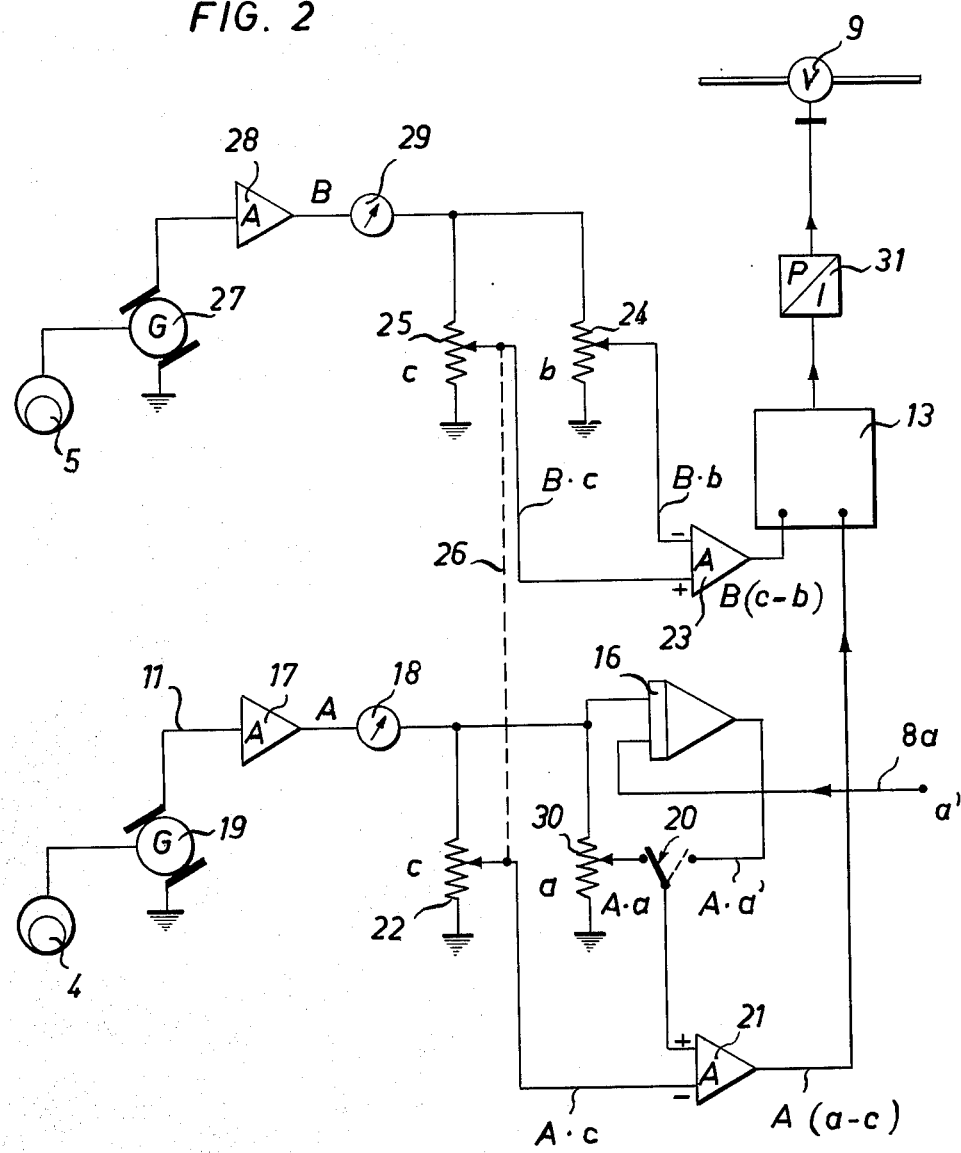
FIG. 2 is a circuit diagram of the computer of the apparatus according to FIG. 1.

This particular application is apparent from FIG. 2 which represents essentially a circuit diagram of the computer. The electric value $a'$ which is variable and corresponds to the particular fat content value measured and which is supplied by the fat content evaluator 8 (see FIG. 1) via the line 8a to the computer is supplied to a multiplier 16 which is also acted on via the line 11 comprising an amplifier 17 and an indicator device 18 by a voltage value A which corresponds to the particular flow quantity passing through the volumeter 4 for the whole milk. The volumeter 4 drives a generator 19 which supplies the starting value for the voltage A.

Thus the product A·a' or AXa' is produced at the output of the multiplier 16. This product is supplied via a manual switch in its position on the right in FIG. 2 to a subtracting operational amplifier 21. The product A·c is also supplied to the subtracting operational amplifier 21 and this is deducted from the product A·a' in the operational amplifier 21. Thus at the output of the operational amplifier 21 the expression A(a'-c) is obtained. This product is supplied to the regulator 13. The regulator is thereby acted on in dependence on the changing fat content $a'$ which is determined by the fat content evaluator 8. To form the product A·c, that is, to feed in the fixed, prescribed fat content nominal value of the standardized milk, the voltage divider 22 is provided, the tapped value of which corresponds as described to the particular fat content value c of the standardized milk.

A second subtracting operational amplifier 23 is provided to allow the flow quantity of skimmed milk and the fixed fat content value of the skimmed milk to act on the regulator. The product to be deducted B.b is supplied to the second subtracting operational amplifier 23 via a voltage divider 24 and the product B.c to the amplifier 23 via a voltage divider 25. Thus at the output of the operational amplifier 23 the expression B(c-b) is obtained and this acts on the regulator 13. The pre-set tapped values of the voltage dividers 24 and 25 correspond to the fat content value b of the skimmed milk or the fat content value c of the standardized milk. Since the same voltage is involved for both the voltage divider 22 and 25, these two voltage dividers are mechanically coupled as indicated by the perforated line at 26.

The flow quantity b of the skimmed milk is in this case again supplied by means of the volumeter 5 in the form of a voltage produced by a generator 27 to the voltage dividers 24 and 25 via an amplifier 28 and an indicator device 29.

In FIG. 2 there is also a possibility of using a fixed fat content value $a$ of the whole milk in place of the variable value $a'$ for controlling the adjusting valve 9. For this purpose, a further voltage divider 30 is provided which is acted on by the voltage A and the tapped value of which thus corresponds to the product A·a. The voltage divider 30 is connected to the manual switch 20 and when the switch is turned to the left, as shown in FIG. 2, it is thus connected to the subtracting operational amplifier 21 thereby producing the product A(a-c) at the output of this operational amplifier 21. This product A(a-c) is supplied to the regulator 13. As already described, this type of fixed value can be used in the event that the sampling device or the fat content evaluator become inoperative or when the device is started up.

As a regulated quantity at the output of the regulator 13, it is possible for example, to use a current I which can act in a known way on a translator 31 such as the EP-Converter in which the current I is converted into a penumatic pressure p which acts on the adjusting valve 9.

Figure 3:
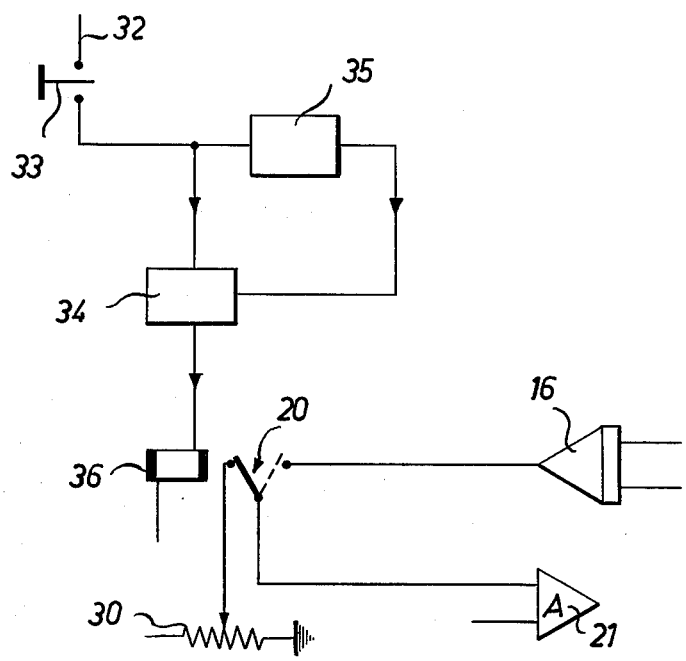
FIG. 3 is a circuit diagram of an arrangement for eliminating a measuring error when the apparatus is started.

FIG. 3 shows in diagrammatic form a possible method of preventing a mixing ratio from being passed along into the mixing line 3 (see FIG. 1) when the apparatus is started up. This ratio does not correspond to the present values owing to the fact that milk still remains in the device. To this end, in the embodiment according to FIG. 3, a storage member 34 is provided in a start line 32 comprising a starter 33 with which the entire apparatus can be connected in. This storage member 34 acts on the adjusting valve 9 for the skimmed milk in a closing direction for a sufficient length of time until a timer 35 arranged in parallel therewith releases the storage value so that the adjusting valve 9 is acted on in the opening direction. The value set by the timer 35 can correspond to the time value of the passage of the remaining milk when starting up the device. Thus, in the present case this amounts to approximately 20 seconds. The arrangement according to FIG. 3 can also be used in the manner indicated to activate the switch 20 wherein during the starting process the storage member moves the switch 20, for example, by a relay 36 into the position in which the operational amplifier 21 is acted on by a fixed value a for the whole milk fat content. As already described, this fat content value is intended to release the minimum addition of skimmed milk so that the fat content of the standardized milk does not fall below the legally required content. The action on the switch 20 thus offers the possibility of adding at least part of the skimmed milk when starting up the device.

Figure 4:
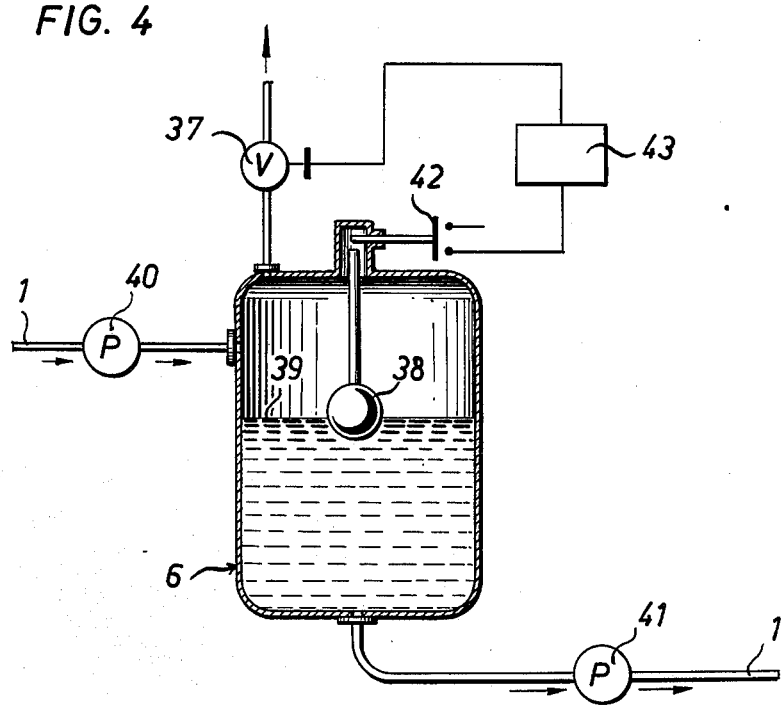
FIG. 4 is a diagrammatic view of an apparatus for varying the volume of the storage container.

FIG. 4 shows a diagrammatic view of an embodiment for influencing the volume of the storage container 6 according to FIG. 1, wherein the storage container 6 is provided with a ventilating valve 37 and with a float 38 which is activated by the fluid level in the storage container 6. For the arrangement according to FIG. 4, it is necessary to provide a pump 40 or 41 in the whole milk supply line 1 both in front and behind the storage container.

On reaching a specific fluid level, the float 38 activates a contact 42 which is arranged in series with a timer 43 which in turn acts in a closing direction on the ventilating valve. In the arrangement according to FIG. 4, when the level of the fluid 39 reaches a value at which the float 38 activates the contact 42, the timer 43 starts but the ventilating valve 37 still remains open and is only closed by the timer 43 after a preset period of time. During the intermediate period, the level of the liquid 39 rises in the storage container 6 so that a large volume is present in the storage container 6 and thus in the whole milk supply line 1. However, at the same time, the duration of passage of the individual parts of whole milk flowing through the supply line 1 and the storage container 6 also changes and thus when varying evaluators are used for determining the fat content or for other reasons, time adjustment is possible. Thus at the point 15 according to FIG. 1 even with varying periods of time the parts of whole milk which have just been calculated always coincide with the skimmed milk additions corresponding to these values. Thus, with the arrangement according to FIG. 4, it is possible within certain limits to preset on the timer 43 the duration of flow through the supply line 1 and thus the volume in the supply line 1.

Apart from being used for regulating the fat content of milk, the method according to the present invention and the apparatus according to the invention can also be used to obtain mixtures of other liquids where the mixing ratios or the quantities of specific admixtures have to be accurately regulated as, for example, in the case where constituents are added to fruit juices or in the mineral oil industry.

I claim:

1. An apparatus for obtaining a given fat content in milk wherein whole milk and skimmed milk are mixed, comprising a first supply line for whole milk and a second supply line for skimmed milk, said first supply line having a first volumeter and a first opening connected to a common mixing line, said second supply line having a second volumeter and a second opening connected to said common mixing line, an adjustable valve acted on by a regulator being arranged in said second supply line, an automatic sampling device (7) comprising a fat content evaluator (8) arranged in said first supply line (1) in front of said first volumeter (4), said sampling device (7) being connected to a computer (10) which is actuated by signals from said volumeters (4,5) and is combined with the regulator (13) and the volume of said first supply line (1) is such that the time taken by the milk to pass through it corresponds to the evaluation time of the sample from the time of taking the sample to the time said adjustable valve (9) is adjusted.

2. The apparatus of claim 1, wherein the volume of said supply line (1) is regulatable.

3. The apparatus of claim 2, wherein storage container (6) increases the volume of said first supply line (1) and is provided in said first supply line (1).

4. The apparatus of claim 3, wherein the volume of said storage container (6) is regulatable.

5. The apparatus of claim 4, wherein said storage container (6) is provided with an adjustable base.

6. The apparatus of claim 4, wherein said storage container is provided with adjustable walls.

7. The apparatus of claim 4, wherein said storage container (6) is provided with a ventilating valve (37) adapted to be closed by a timer (43) which is adapted to be released by a float (38) in said storage container (6).

8. The apparatus of claim 7, wherein said sampling device (7) has a pipette adapted to sample approximately 1 gr/sec. and said fat content evaluator (8) is a photometric device.

9. The apparatus of claim 8, wherein the evaluation time and the flow through said first supply line (1) including the storage container (6) amounts to approximately 20 seconds.

10. The apparatus of claim 9, wherein said computer (10) is acted on by a nominal value (c) for said given fat content of standardized milk and by an actual value (b) of the fat content of said skimmed milk.

11. The apparatus of claim 10, wherein said computer (10) has a fat content signal (a') coming from said fat content evaluator (8) supplied via a multiplier (16) to a subtracting operational amplifier (21) together with a value corresponding to the product of said nominal value (c) of standardized milk and the flow velocity (A) of said whole milk, the output of the subtracting operational amplifier (21) being connected to the regulator (13).

12. The apparatus of claim 11, wherein a second subtracting operational amplifier (23) has an output connected to said regulator (13), the products of the flow quantity (B) of the skimmed milk together with said nominal value (c) of standardized milk and the fat content value (b) of the skimmed milk is supplied to said second operational amplifier (23).

13. The apparatus of claim 12, wherein regulatable resistances form particular products (A·c, B·c, B·b) to which said flow velocities are supplied in the form of voltages (A,B), preselected values of said resistance corresponding to the actual values (b,c) to be determined for standardized milk and skimmed milk.

14. The apparatus of claim 13, wherein said regulatable resistances define two identical voltage dividers (22, 25) provided for the fat content value (c) of the standardized milk, said voltage dividers (22, 25) being mechanically coupled to one another at (26), one of said dividers (22,25) being provided for the voltage values (A) of the flow velocities of whole milk and the other being provided for the voltage values (B) of the flow velocities of skimmed milk.

15. The apparatus of claim 14, wherein a further voltage divider (30) is provided which is adapted to be connected by means of a manual switch (20) to said first subtracting operational amplifier (21) in place of the value (A·a') coming from said fat content evaluator (8) and which is used to provide a fixed value (a) for said fat content of the whole milk.

16. The apparatus of claim 15, wherein storage member (34) is provided in the starting line (32) of the apparatus, said starting member (34) being connected in parallel to a timer switch (35), the storage member acting in a closing direction on the adjusting valve (9) in said second supply line (2) for a time sufficient until the timer (35) releases the storage value.

17. The apparatus of claim 16, wherein said adjustable valve (9) is not completely closed by the storage member (34) but on a residual value of the skimmed milk admixture.

18. The apparatus of claim 17, wherein said storage member (34) acts on said manual switch (20) of said voltage divider (30) for the application of said fixed value (a) of the fat content of the whole milk in the direction of connecting in this fixed value.

19. The apparatus of claim 7, wherein said storage container is the vapor eliminator of a volume measuring device.

* * * * *